US005272317A

United States Patent [19]

Ryu

[11] Patent Number: 5,272,317

[45] Date of Patent: Dec. 21, 1993

[54] FOOD SUPPORT SHELF COMPRISING METAL GRILL WITH HEATER

[75] Inventor: Wook R. Ryu, Suweon, Rep. of Korea

[73] Assignee: Samsung Electronics Co., Ltd., Suwon, Rep. of Korea

[21] Appl. No.: 873,235

[22] Filed: Apr. 24, 1992

[30] Foreign Application Priority Data

Feb. 2, 1992 [KR] Rep. of Korea ...................... 92-1642

[51] Int. Cl.[5] .......................... A21B 1/00; F27D 11/00

[52] U.S. Cl. .................................... 219/403; 219/392; 219/395; 219/409

[58] Field of Search ............... 219/402, 403, 404, 392, 219/395, 396, 397, 398, 408, 409

[56] References Cited

U.S. PATENT DOCUMENTS

| | | | |
|---|---|---|---|
| 1,208,637 | 12/1916 | Phelps | 219/403 |
| 1,376,829 | 5/1921 | Phelps | 219/403 |
| 2,024,386 | 12/1935 | Phelps | 219/403 |
| 2,137,149 | 11/1938 | Tuttle | 219/403 |
| 2,174,079 | 9/1939 | Dadson | 219/403 |
| 2,668,222 | 2/1954 | McCormick | 219/403 |
| 3,265,861 | 8/1966 | Perlman | 219/399 |
| 3,688,084 | 8/1972 | Charneski | 219/397 |

*Primary Examiner*—Bruce A. Reynolds
*Assistant Examiner*—John A. Jeffery
*Attorney, Agent, or Firm*—Burns, Doane, Swecker & Mathis

[57] ABSTRACT

A cooking oven includes a cooking compartment with removable shelves. Each shelf includes a frame and a removable electrical resistance heater. The heater plugs into an electrical socket formed in a back wall of the compartment.

17 Claims, 5 Drawing Sheets

FIG. 3
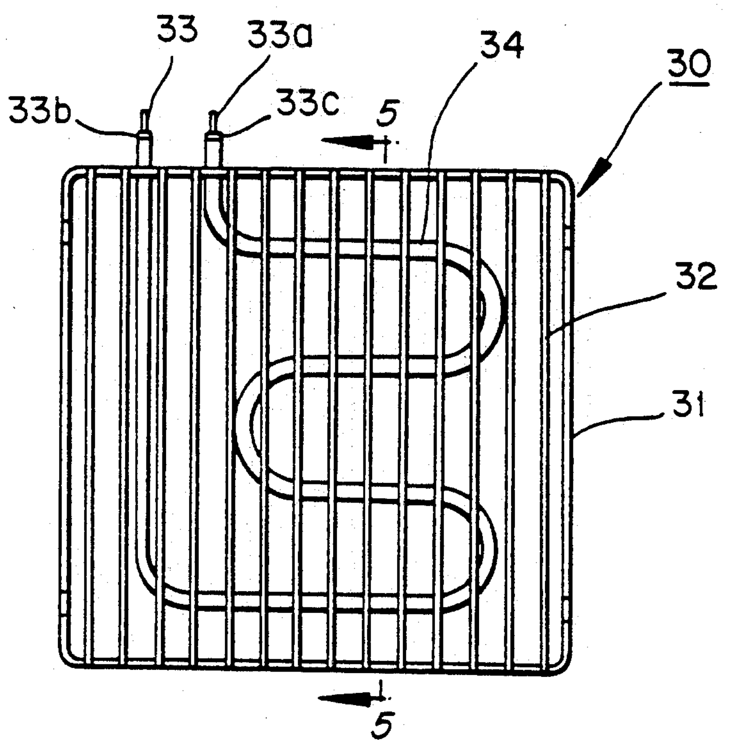
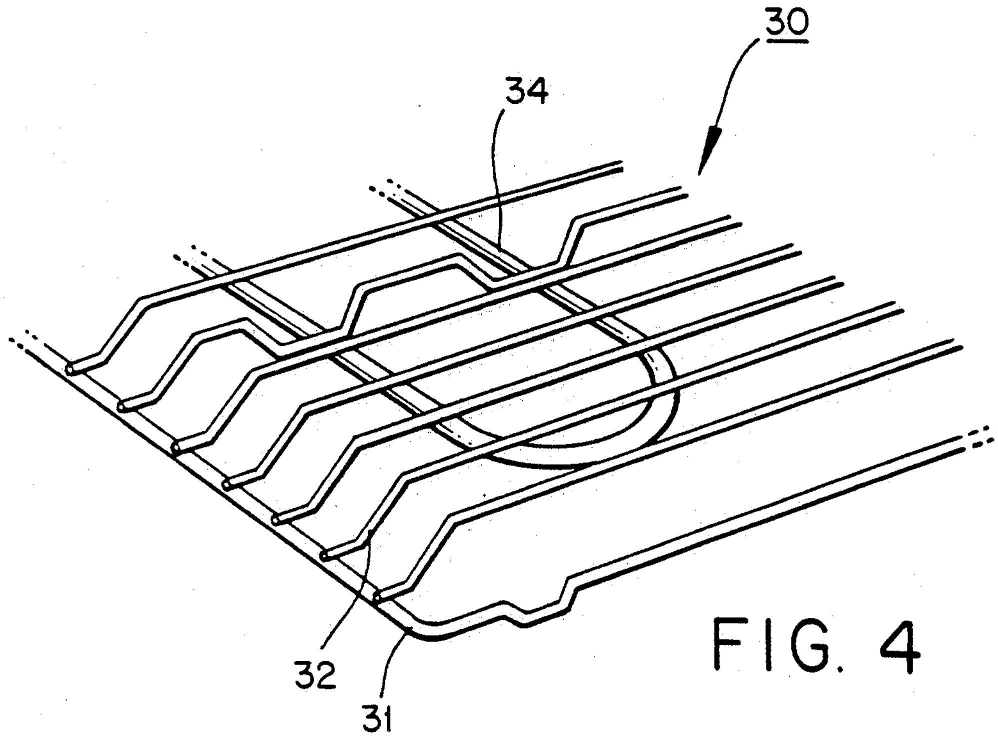
FIG. 4

FIG. 5
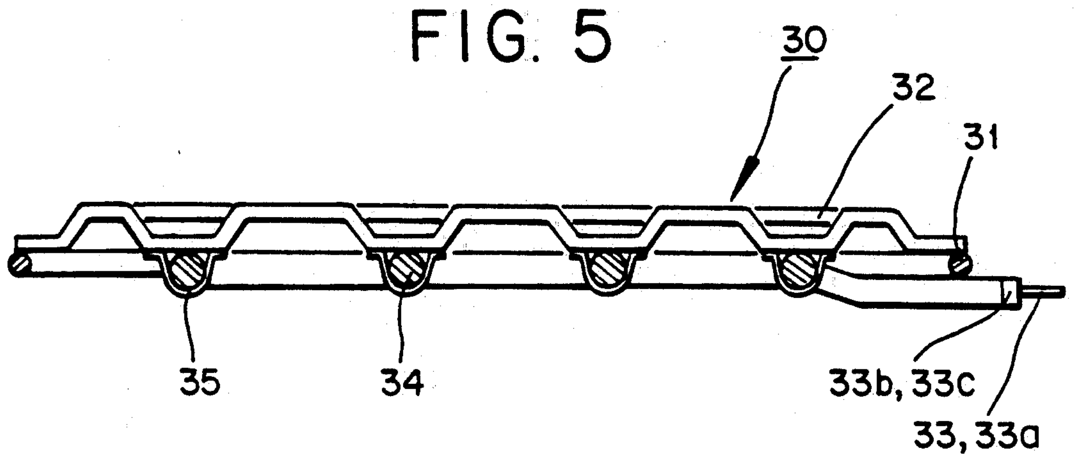
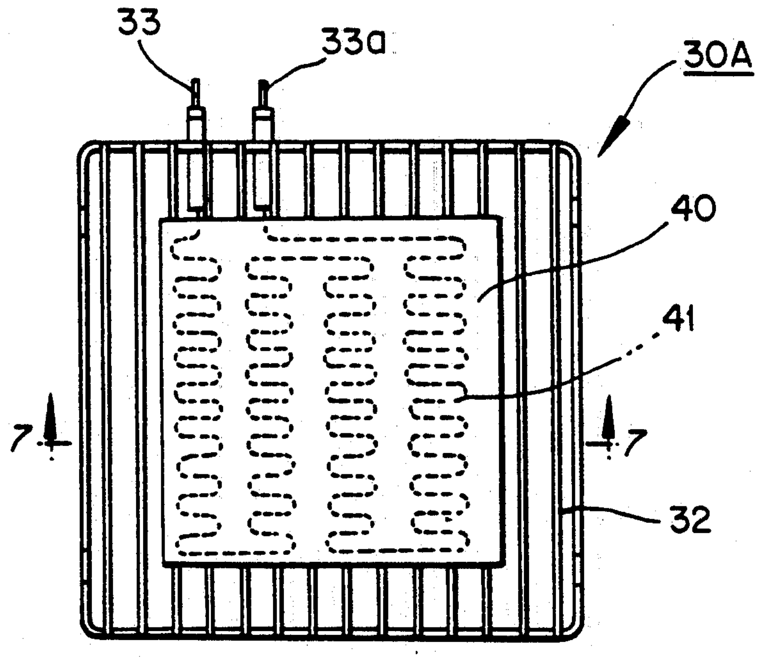
FIG. 6

FOOD SUPPORT SHELF COMPRISING METAL GRILL WITH HEATER

BACKGROUND OF THE INVENTION

The invention relates to a metal grill suitable for a cooking apparatus, such as a microwave oven or a gas oven, with a heater mounted on at one face of a series of thin metal rods of the metal grill.

Generally, cooking apparatus available today have an oven function as well as a grill function in a single unit such that the user chooses the function desired. One example of a conventional cooking apparatus has a structure with an electrically energized heater for emitting heat and being mounted at the top of a compartment. In a separate structure from the above heater, a plurality of metal grills are used, with each grill having a plurality of rods for placing thereon food to be cooked. The food is cooked by the heat of the heater. However, since the one heater is fixedly mounted in the top of the compartment, there is a problem in that the heat cannot reach the food placed in the bottom of the compartment, resulting in insufficient heat distribution for cooking the food. Further because the metal grills are located on different rails, i.e., the grills being spaced apart, the heat from the heater fails to evenly reach all the food on each metal grill, thereby decreasing the heating efficiency of the apparatus for cooking food.

Therefrom, in order to overcome the above problems, a couple of heaters are fixedly mounted in the top and bottom of the compartment, respectively. Furthermore, a fan is installed in one wall of the compartment with a heater surrounding the fan. By forcibly circulating the heat generated by the heater by the fan, the efficiency of the cooking apparatus is greatly increased. Generally, the skin of the food being grilled may be seared so as to prevent a large amount of moisture from escaping from the inside of the food. This action requires directly heating the food.

However, in the above conventional cooking apparatus, there is a problem in that the grilling effect cannot be easily used due to an excessive increase in the temperature of the compartment. That is, the in a high efficiency oven the heat is given to the food evenly and slowly rather than quickly to the food outer surface as required for grilling. And it is difficult to produce the grill effect whilst the conventional cooker performs the cooking process quickly. Further, there is a problem in that the working volume of the compartment is decreased due to the heaters being fixedly installed in the top and the bottom of the compartment. Also, because of the positioning of the heaters, it is difficult and inconvenient to clean the compartment. In addition, since the cooker is constructed with a fan, the heat is applied indirectly to the food, causing an oven (i.e., baking) function rather than a grill function.

SUMMARY OF THE INVENTION

An object of the present invention is to provide a metal grill with a heater for solving the above problems.

Another object of the present invention is to provide a metal grill with a heater which attaches directly to the grill so as to apply heat directly to food.

Another object of the present invention is to provide a metal grill with a heater which can change space of the metal grill so as to do an effective cooking according to a characteristic of the food.

A further object of the present invention is to provide a metal grill with a heater which can be mounted in the compartment of a cooking apparatus for allowing the compartment to be easily cleaned.

In accordance with the present invention, the metal grill comprises a heater mounted on at least one face of a series of a thin metal rods which make up the metal grill, for emitting heat upon being supplied with electrical power. The heater comprises an electrical resistance member is formed and a connector protruding from the ends thereof, for demountably coupling with a socket for supplying electrical power to the heater with the socket being mounted on the inner rear wall of the cooking compartment.

Further, the heater comprises a heating wire for emitting heat, and a tube enclosing the wire. The heater is detachably mounted on the metal rods of the grill by a plurality of brackets.

Furthermore, the heater comprises, a heating wire for emitting heat, a pair of mica sheets blanketing the upper and lower surfaces of the heating wire, and a flattening plate extended over each mica sheet. The heater is mounted on the metal rods by means of a Z shape sheet along the periphery of the heater.

BRIEF DESCRIPTION OF THE DRAWING

FIG. 3 is a plan view of a first embodiment of a metal grill of the present invention;

FIG. 4 is a fragmentary view of the metal grill of FIG. 3;

FIG. 5 is an enlarged sectional view taken on line 5—5 of FIG. 3;

FIG. 6 is a plan view of a second embodiment of a metal grill of the present invention;

DESCRIPTION OF THE PREFERRED EMBODIMENTS

Figure 1:
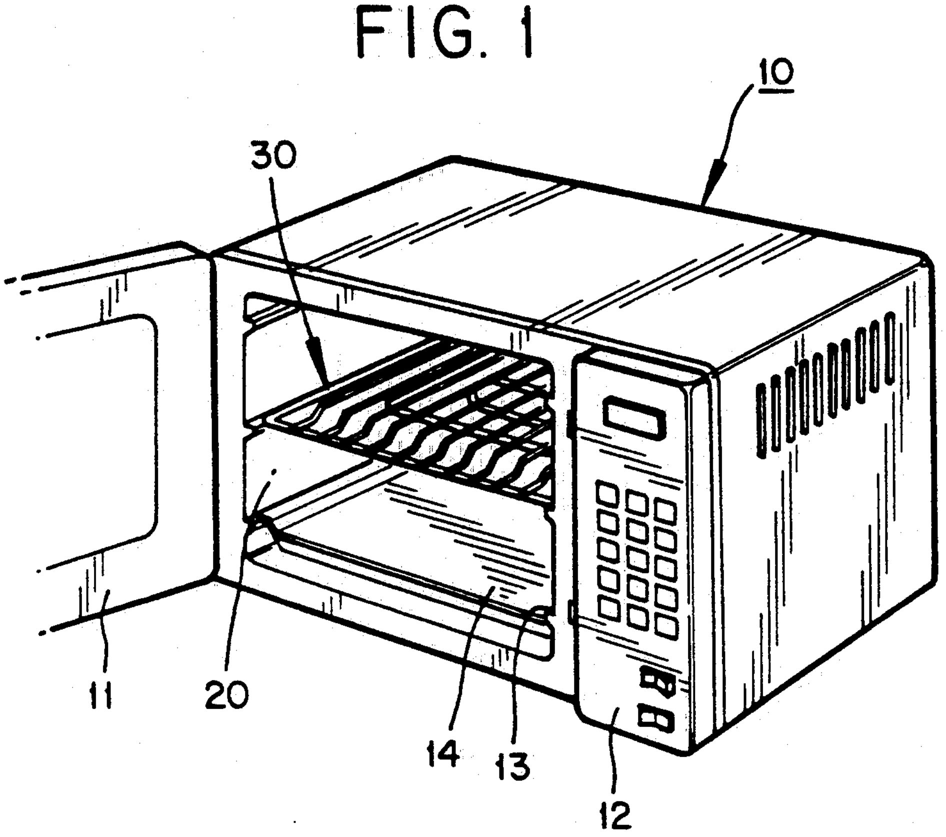
FIG. 1 is a perspective view of a cooking oven with a metal grill of the present invention with the oven door in an open position.
Figure 2:
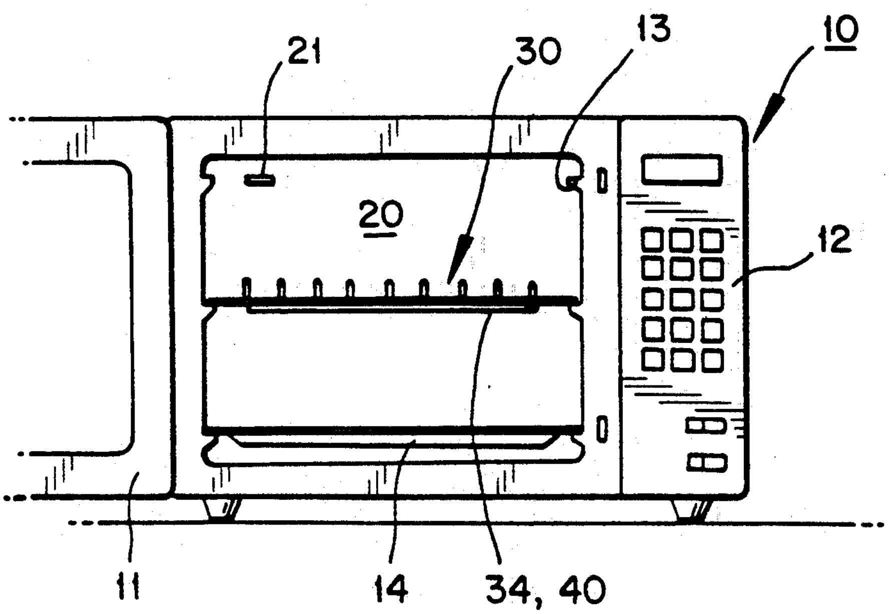
FIG. 2 is a front view of a cooking oven shown in FIG. 1.

Numeral 10 shown in FIGS. 1 and 2 illustrates a cooking oven with metal grill of the present invention operatively positioned therein. The oven 10 comprises a cooking compartment 20 which is closed/opened by a door 11 hingedly mounted on a front side edge of the oven 10, and a control section 12 located near the compartment 20, for electrically controlling the heating of oven 10. The cooking compartment 20 provides a plurality of, e.g., three pairs of grill supporting rails 13 formed on opposite side walls of the compartment 20. Each rail pair 13 is constructed and positioned in the oven so as to slidingly receive a metal grill 30 or, a tray 14 and the like as illustrated in FIG. 2. A socket 21 is positioned on the inner rear wall of the compartment 20 so as to couple with connectors 33,33*a* (FIG. 3) of an uppermost metal grill (not shown) of the present invention. Also, additional sockets (not visible in FIG. 2) are installed on the inner rear wall of the compartment 20 for an intermediate metal grill 30 and tray 14 shown in FIG. 2.

The metal grill 30 as shown in FIGS. 3, 4 and a lower 5 includes a peripheral rod 31 in a shape of a rectangle. A series of thin metal rods 32 extend from the front end to the rear one of the peripheral rod 31, all of which are securely welded to the rod 31. Across bottom surface of the thin metal rods 32, a heater 34 is mounted on the thin metal rods 32 by a plurality of brackets 35. The heater 34 is of a zig-zag shape, which increases the amount of radiation the heater 34 provides the surface of the metal grill 30. The heater 34 comprises a heating wire (not shown) for emitting heat and a tube for shielding the heating wire. Preferably, the heating wire is coiled nickel-chromium, and the tube is stainless steel. Further, the connectors 33,33*a* are assembled to the heater 34 with a couple of ceramic rings 33*b*,33*c* for insulation. The connectors 33,33*a* are configured to be removeably insertable into the socket or receptacle 21. That is, the configuration of each of the connectors 33,33*a* is a pin, while the socket 21 has a corresponding configuration to that of the connector 33,33*a*.

Figure 7:
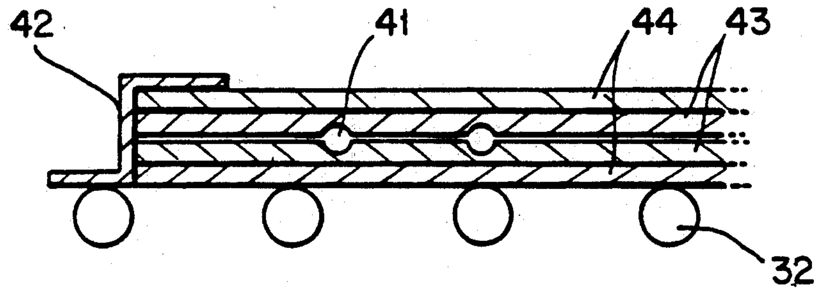
FIG. 7 is an enlarged sectional view taken on line 7—7 of FIG. 6.

Another embodiment of the present invention is illustrated in FIGS. 6 and 7. In this embodiment, the same numerals as used in the first embodiment are used in this embodiment and have the same function as in the first embodiment. The metal grill 30A is constructed by securely mounting the heater 40, with a connector 33,33*a* attached to each end of the heater 40), on to the upper surface of the thin metal rods 32 by using a Z shape sheet 42 secured to the periphery of the heater 40. The heater 40 comprises a heating wire 41 for emitting heat, and a mica sheet 43 having a groove for receiving the heating wire 41 which extends in a zig-zag shape, a couple of the mica sheets 43 blanket the upper and lower surfaces of the wire 41 as illustrated in FIG. 7. Further, the heater 40 has a pair of flattening plates 44 each of which extends across a mica sheet 43. Preferably, the heating wire 41 is nickel-chromium and the flattening plate 44 is steel plate covered with enamel, ceramic, glass, or an aluminum.

Each of the metal grills 30, 30A of the present invention described above may be slidingly received onto the rails 13 in the compartment 20. The connectors 33,33*a* are electrically coupled to the socket 21 of the compartment 20. Upon supplying electricity to the heater 34,40 under the control of the control section 12 of the oven 10, the heater 34,40 emits heat. With the heat, the food placed on the metal grill 30,30A is cooked. The positioning of cooking the food on or relative to the grill of the present invention according to size, configuration and the like is shown in FIGS. 8A, 8B and 8C.

Figure 8A:
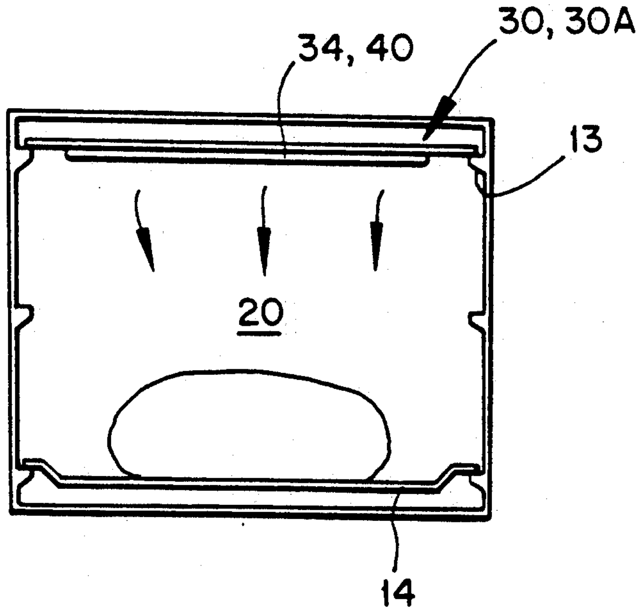
FIGS. 8A, 8B and 8C are plan views illustrating different positioning of the metal grill of the present invention for cooking purposes.

FIG. 8A illustrates the tray 14 having food placed thereon is located in bottom of the compartment 20, and one of the metal grills 30, or the grill 30A positioned upside down is located at the top of the compartment 20 in accordance with the volume of the food to be cooked. For small sized food, either a metal grill 30, 30A may be positioned in middle of the compartment 20 so as to emit heat closer to the food and therefore cook at greater efficiency.

Figure 8B:
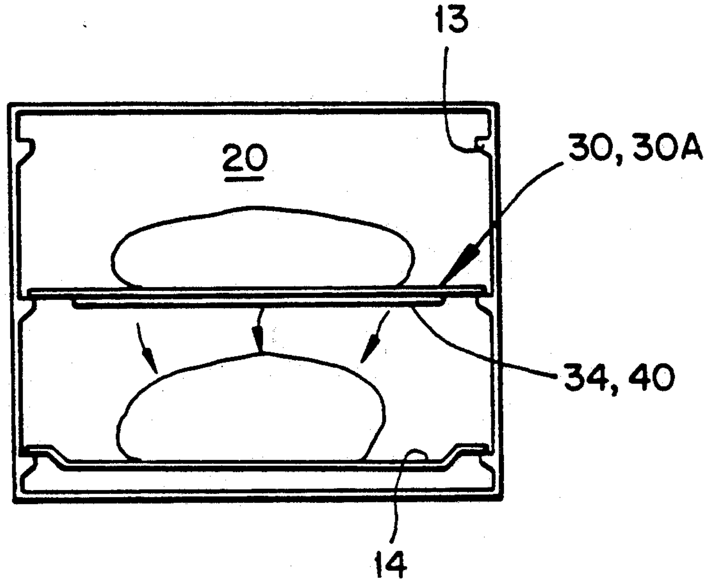

FIG. 8B illustrates the case where two kinds of food are being cooked simultaneously. One kind of food is placed on the metal grill 30 or the grill 30A positioned upside down, and the another kind of food is placed on the tray 14. The metal grill 30 or 30A is located on the middle rail 13B of the compartment 20, and the tray 14 is located on the lower rail 13C of the compartment 20. Therefore, the heat emitted from the metal grill 30 or 30A is received by the food on the tray 14 as well as the food on the metal grill 30 or 30A, thereby achieving an effective cooking of both foods.

Figure 8C:
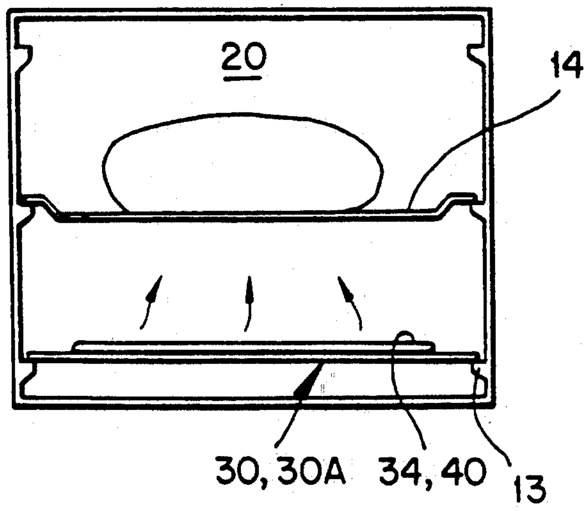

FIG. 8C illustrates, according to the cooking characteristic of a particular food, the metal grill or the grill 30 positioned upside down, i.e., heat element placed toward the top of the oven 10, is located on the lower rail 13C of the compartment 20, and the tray 14 carrying the food thereon is located on the middle rail 13B of the compartment 20. The heat is applied to the bottom of food to satisfy the characteristic of the food being cooked.

As described above, the metal grill with a heater according to the present invention allows the heat emitted from the heater attached on the metal grill to be directly applied to food to improve the heating and cooking efficiency of the heater.

What is claimed is:

1. A cooking oven comprising a cooking compartment having a plurality of supports disposed at different levels, respectively, within the compartment and at least one removable shelf mountable on a selected support for receiving food to be cooked, and an electrical resistance heater connected to the shelf and having releasable connector means for making electrical connection with power supply connector means communicating with the compartment, the heater comprising a pair of mica sheets sandwiching a heating wire between opposing inner surfaces thereof, two respective outer plates disposed on respective outer surfaces of the mica sheets, and Z-shaped sheets disposed along peripheral portions of the heater for connecting the heater to the shelf.

2. A cooking oven according to claim 1, wherein the shelf is oriented substantially horizontally when mounted on a support and includes upper and lower surfaces, the heater being mounted on one of the upper and lower surfaces.

3. A cooking oven according to claim 2, wherein the heater is mounted on the lower surface of the shelf.

4. A cooking oven according to claim 2, wherein the heater is mounted on the upper surface of the shelf.

5. A cooking oven according to claim 2, wherein the shelf comprises a plurality of horizontally spaced rods, the heater including a heating wire of zig-zag shape.

6. A cooking oven according to claim 5, wherein the compartment includes a back wall, the releasable connector means of the heater comprising a pair of projections, the power supply connector means comprising sockets located in the back wall for receiving the projections when the shelf is inserted into the compartment.

7. A cooking oven according to claim 6, wherein each support comprises a pair of rails disposed on opposing side walls, respectively, of the compartment.

8. A cooking oven according to claim 1, wherein the heater is detachably mounted to the shelf.

9. A cooking oven according to claim 8, wherein the heater is mounted to the shelf by detachable brackets.

10. A cooking oven according to claim 1, wherein the heater comprises a heating wire encased in an outer tube.

11. A shelf adapted for use in a cooking compartment of an oven to support food, comprising a frame and an electric resistance heater connected to the frame, the heater including releasable connector means for making electrical connection with electrical supply connector means, and Z-shaped sheets disposed along peripheral portions of the heater for connecting the heater to the shelf.

12. A shelf according to claim 11, wherein the frame comprises a plurality of spaced rods.

13. A shelf according to claim 12, wherein the rods form upper and lower surfaces of the frame, the heater being mounted on one of those surfaces.

14. A shelf according to claim 11, wherein the heater includes a heating wire of zig-zag shape.

15. A shelf according to claim 11, wherein the heater is detachably mounted to the frame.

16. A shelf according to claim 11, wherein the heater comprises a heating wire encased in an outer tube.

17. A shelf according to claim 11, wherein the heater comprises a pair of mica sheets sandwiching a heating wire between respective inner surfaces thereof, and two respective outer plates disposed on respective outer surfaces of the mica sheets.

* * * * *